United States Patent
Morse et al.

(10) Patent No.: US 9,038,624 B2
(45) Date of Patent: May 26, 2015

(54) SOLAR BOILER TUBE PANEL SUPPORTS

(75) Inventors: Gregory L. Morse, Auburn, MA (US);
Michael D. Ringer, Jr., Leominster, MA (US); Ivo Slezak, Hubbardston, MA (US); Russell Ricci, Brookfield, MA (US)

(73) Assignee: Babcock Power Services, Inc., Worcester, MA (US)

( * ) Notice: Subject to any disclaimer, the term of this patent is extended or adjusted under 35 U.S.C. 154(b) by 796 days.

(21) Appl. No.: 13/155,977

(22) Filed: Jun. 8, 2011

(65) Prior Publication Data

US 2012/0312296 A1 Dec. 13, 2012

(51) Int. Cl.
*F24J 2/07* (2006.01)
*F24J 2/24* (2006.01)

(52) U.S. Cl.
CPC .. *F24J 2/07* (2013.01); *F24J 2/242* (2013.01); *Y02E 10/44* (2013.01); *Y02E 10/41* (2013.01); *Y10S 248/901* (2013.01)

(58) Field of Classification Search
CPC ............ F24J 2/07; F24J 2/242; F24J 2/4636; F24J 2002/5283; F24J 2002/5288; F24J 2002/5496; F24J 2002/5458; F22B 37/205–37/208
USPC ............ 126/680, 714, 634; 122/510; 248/901
See application file for complete search history.

(56) References Cited

U.S. PATENT DOCUMENTS

| | | | |
|---|---|---|---|
| 2,383,234 A | 8/1945 | Barnes | |
| 2,815,415 A * | 12/1957 | Anderson | 337/388 |
| 2,948,267 A * | 8/1960 | Koch et al. | 122/481 |
| 3,197,343 A | 7/1965 | Palmatier | |
| 3,208,877 A | 9/1965 | Merry | |
| 3,277,870 A * | 10/1966 | Reale | 122/6 A |
| 3,325,312 A | 6/1967 | Sonntag, Jr. | |
| 3,379,177 A * | 4/1968 | Stalph | 122/6 A |
| 3,393,665 A * | 7/1968 | Juchtern | 122/510 |
| 3,450,192 A | 6/1969 | Hay | |
| 3,459,597 A | 8/1969 | Baron | |

(Continued)

FOREIGN PATENT DOCUMENTS

| | | | |
|---|---|---|---|
| FR | 2501839 A1 | 9/1982 | |
| JP | 53131309 A | 11/1978 | |

(Continued)

OTHER PUBLICATIONS

U.S. Appl. No. 60/943,096, filed Jun. 11, 2007, Kroizer et al.

(Continued)

*Primary Examiner* — Avinash Savani
*Assistant Examiner* — Deepak Deean
(74) *Attorney, Agent, or Firm* — Locke Lord LLP; Joshua L. Jones; Alicia J. Esposito

(57) ABSTRACT

A solar boiler includes a boiler support defining an axis along an inboard-outboard direction. A hanger rod is rotatably mounted to the boiler support. A bracket is rotatably mounted to the hanger rod, and a solar boiler panel is mounted to the bracket. The solar boiler panel defines a longitudinal axis that is substantially perpendicular with the axis of the boiler support. The hanger rod connects between the boiler support and the bracket to support the weight of the solar boiler panel from the boiler support. The hanger rod and bracket are configured and adapted to maintain a substantially constant orientation of the bracket during inboard and outboard movement of the bracket relative to the boiler support.

18 Claims, 9 Drawing Sheets

(56) References Cited

U.S. PATENT DOCUMENTS

| | | | |
|---|---|---|---|
| 3,464,402 A | 9/1969 | Collura | |
| 3,637,176 A * | 1/1972 | Suozzo | 248/59 |
| 3,669,391 A * | 6/1972 | Suozzo | 248/550 |
| 3,814,063 A * | 6/1974 | Bijmholt | 122/6 A |
| 3,822,692 A | 7/1974 | Demarest | |
| 3,823,703 A | 7/1974 | Lanciault | |
| 3,893,506 A | 7/1975 | Laing | |
| 3,924,604 A | 12/1975 | Anderson | |
| 3,927,659 A | 12/1975 | Blake et al. | |
| 3,951,108 A * | 4/1976 | Rees | 122/510 |
| 3,968,652 A | 7/1976 | Chevalier | |
| 3,991,742 A | 11/1976 | Gerber | |
| 3,995,804 A | 12/1976 | Folds et al. | |
| 4,003,366 A | 1/1977 | Lightfoot | |
| 4,037,639 A | 7/1977 | Jones | |
| 4,088,266 A | 5/1978 | Keyes | |
| 4,094,147 A | 6/1978 | Alleau et al. | |
| 4,112,921 A | 9/1978 | MacCracken | |
| 4,120,288 A | 10/1978 | Barrett | |
| 4,127,102 A | 11/1978 | Berman | |
| 4,127,103 A | 11/1978 | Klank et al. | |
| 4,128,096 A | 12/1978 | Katz | |
| 4,136,674 A | 1/1979 | Korr | |
| 4,137,967 A * | 2/1979 | Hirschle | 165/162 |
| 4,191,246 A | 3/1980 | Cassell | |
| 4,204,523 A | 5/1980 | Rothe | |
| 4,205,658 A | 6/1980 | Clark | |
| 4,210,122 A | 7/1980 | Artweger | |
| 4,215,676 A | 8/1980 | Gilliam | |
| 4,237,861 A | 12/1980 | Fayard et al. | |
| 4,245,618 A | 1/1981 | Wiener | |
| 4,253,801 A | 3/1981 | O'Hare | |
| 4,257,477 A | 3/1981 | Maloney | |
| 4,261,330 A | 4/1981 | Reinisch | |
| 4,265,223 A | 5/1981 | Miserlis et al. | |
| 4,269,172 A | 5/1981 | Parker et al. | |
| 4,273,100 A | 6/1981 | Cogliano | |
| 4,280,483 A | 7/1981 | Schaffer | |
| 4,286,549 A * | 9/1981 | Eisinger | 122/510 |
| 4,289,114 A | 9/1981 | Zadiraka | |
| 4,296,730 A | 10/1981 | Zadiraka | |
| 4,296,733 A | 10/1981 | Saunders | |
| 4,312,687 A | 1/1982 | Sigworth, Jr. | |
| 4,313,304 A | 2/1982 | Hunt | |
| 4,320,663 A | 3/1982 | Francia | |
| 4,324,229 A | 4/1982 | Risser | |
| 4,338,991 A | 7/1982 | Sigworth, Jr. | |
| 4,350,374 A | 9/1982 | Brollo | |
| 4,353,356 A | 10/1982 | Vandenbossche | |
| 4,359,043 A | 11/1982 | Dominique et al. | |
| 4,367,726 A | 1/1983 | Maes, Jr. | |
| 4,371,035 A | 2/1983 | Soligno | |
| 4,373,512 A | 2/1983 | Hirt | |
| 4,380,996 A | 4/1983 | Mengeringhausen | |
| 4,384,550 A | 5/1983 | Miller | |
| 4,394,859 A | 7/1983 | Drost | |
| 4,404,960 A | 9/1983 | Laing | |
| 4,416,265 A | 11/1983 | Wallace | |
| 4,428,361 A | 1/1984 | Straza | |
| 4,432,341 A | 2/1984 | Howe et al. | |
| 4,454,863 A | 6/1984 | Brown et al. | |
| 4,485,803 A | 12/1984 | Wiener | |
| 4,503,903 A | 3/1985 | Kramer | |
| 4,512,336 A | 4/1985 | Wiener | |
| 4,516,750 A * | 5/1985 | Brunner | 248/58 |
| 4,535,755 A | 8/1985 | Roberts | |
| 4,569,331 A | 2/1986 | Tani et al. | |
| 4,615,381 A | 10/1986 | Maloney | |
| 4,653,470 A * | 3/1987 | Carli et al. | 126/663 |
| 4,660,630 A | 4/1987 | Cunningham et al. | |
| 4,665,894 A | 5/1987 | Juhasz | |
| 4,712,338 A | 12/1987 | Trickel | |
| 4,768,345 A | 9/1988 | Kardas | |
| 4,832,119 A | 5/1989 | Bloor et al. | |
| 4,867,133 A | 9/1989 | Sadler | |
| 4,946,512 A | 8/1990 | Fukuroi et al. | |
| 4,972,806 A * | 11/1990 | Marsault | 122/510 |
| 5,163,821 A | 11/1992 | Kelly et al. | |
| 5,174,128 A | 12/1992 | Bourne et al. | |
| 5,201,282 A | 4/1993 | Albrecht | |
| 5,217,000 A | 6/1993 | Pierce-Bjorklund | |
| 5,342,016 A * | 8/1994 | Marsault et al. | 248/610 |
| 5,368,092 A | 11/1994 | Rearden et al. | |
| 5,404,937 A | 4/1995 | Assaf et al. | |
| 5,417,052 A | 5/1995 | Bharathan et al. | |
| 5,444,972 A | 8/1995 | Moore | |
| 5,482,233 A * | 1/1996 | Marko et al. | 248/73 |
| 5,694,774 A | 12/1997 | Drucker | |
| 5,727,379 A | 3/1998 | Cohn | |
| 5,823,176 A | 10/1998 | Harris | |
| 5,850,831 A | 12/1998 | Marko | |
| 5,857,322 A | 1/1999 | Cohn | |
| 5,862,800 A | 1/1999 | Marko | |
| 5,881,456 A | 3/1999 | Bergins et al. | |
| 5,943,985 A | 8/1999 | Hartman | |
| 6,126,120 A | 10/2000 | Quaranta et al. | |
| 6,155,339 A | 12/2000 | Grapengater | |
| 6,173,927 B1 | 1/2001 | Delsol | |
| 6,240,156 B1 | 5/2001 | Matsumoto et al. | |
| 6,301,928 B1 | 10/2001 | Tanatsugu et al. | |
| 6,434,942 B1 | 8/2002 | Charlton | |
| 6,487,859 B2 | 12/2002 | Mehos et al. | |
| 6,497,102 B2 | 12/2002 | Liebig | |
| 6,532,953 B1 | 3/2003 | Blackmon et al. | |
| 6,668,555 B1 | 12/2003 | Moriarty | |
| 6,708,687 B2 | 3/2004 | Blackmon, Jr. et al. | |
| 6,736,134 B2 | 5/2004 | Marko | |
| 6,913,015 B2 | 7/2005 | Pajk | |
| 6,926,440 B2 | 8/2005 | Litwin | |
| 6,931,851 B2 | 8/2005 | Litwin | |
| 7,011,086 B2 | 3/2006 | Litwin | |
| 7,600,350 B2 | 10/2009 | Braunstein | |
| 7,640,746 B2 | 1/2010 | Skowronski et al. | |
| 7,806,377 B2 | 10/2010 | Strizki | |
| 8,333,170 B2 * | 12/2012 | Zaman | 122/512 |
| 8,393,304 B2 * | 3/2013 | Lankinen | 122/511 |
| 2001/0010222 A1 | 8/2001 | Prueitt | |
| 2002/0029869 A1 | 3/2002 | Kodumudi et al. | |
| 2003/0041856 A1 | 3/2003 | Blackmon et al. | |
| 2004/0035111 A1 | 2/2004 | Ven et al. | |
| 2004/0112374 A1 | 6/2004 | Litwin | |
| 2004/0139961 A1 | 7/2004 | Blackmon et al. | |
| 2004/0244376 A1 | 12/2004 | Litwin et al. | |
| 2004/0251002 A1 | 12/2004 | Reichle et al. | |
| 2004/0255571 A1 | 12/2004 | Fetescu et al. | |
| 2005/0016524 A1 | 1/2005 | Broatch | |
| 2006/0225863 A1 | 10/2006 | Levin | |
| 2006/0260314 A1 | 11/2006 | Kincaid et al. | |
| 2007/0089775 A1 | 4/2007 | Lasich | |
| 2007/0119718 A1 | 5/2007 | Gibson et al. | |
| 2007/0227531 A1 | 10/2007 | Garcia Cors et al. | |
| 2007/0295382 A1 | 12/2007 | Oak | |
| 2008/0000231 A1 | 1/2008 | Litwin et al. | |
| 2008/0022685 A1 | 1/2008 | Zhu | |
| 2008/0053523 A1 | 3/2008 | Brown et al. | |
| 2008/0078378 A1 | 4/2008 | Zhu | |
| 2008/0092551 A1 | 4/2008 | Skowronski | |
| 2008/0256953 A1 | 10/2008 | Arkas et al. | |
| 2008/0302357 A1 | 12/2008 | DeNault | |
| 2009/0014057 A1 | 1/2009 | Croft et al. | |
| 2009/0101134 A1 | 4/2009 | Merrett | |
| 2009/0107146 A1 | 4/2009 | Lin | |
| 2009/0114269 A1 | 5/2009 | Fletcher et al. | |
| 2009/0114270 A1 | 5/2009 | Stancel | |
| 2009/0199557 A1 | 8/2009 | Bennett | |
| 2009/0250051 A1 | 10/2009 | Lata Perez | |
| 2009/0260359 A1 | 10/2009 | Palkes | |
| 2009/0276993 A1 | 11/2009 | Fedock et al. | |
| 2010/0101564 A1 * | 4/2010 | Iannacchione et al. | 126/680 |
| 2010/0229853 A1 | 9/2010 | Vandal et al. | |
| 2010/0236183 A1 | 9/2010 | Cusson et al. | |

(56) References Cited

U.S. PATENT DOCUMENTS

FOREIGN PATENT DOCUMENTS

| | | | |
|---|---|---|---|
| JP | 08326223 A | 12/1996 | |
| WO | WO-2008154599 A1 | 12/2008 | |

OTHER PUBLICATIONS

International Search Report and Written Opinion, dated Aug. 30, 2010 for PCT/US2010/023124.
International Search Report and Written Opinion, dated Aug. 31, 2010 for PCT/US2010/023165.
International Search Report and Written Opinion, dated Oct. 13, 2010 for PCT/US2010/023622.
International Search Report and Written Opinion, dated Oct. 13, 2010 for PCT/US2010/023826.
International Search Report and Written Opinion, dated Dec. 13, 2010 for PCT/US2010/023367.
International Search Report and Written Opinion, dated Dec. 13, 2010 for PCT/US2010/023500.
Search Report and Written Opinion issued by the Spanish Patent Office, dated Feb. 7, 2014 for Application No. 201230891 with English Translation of the Written Opinion.
Preliminary Examination Results for Spanish Patent Application No. 201230891 dated Oct. 30, 2014 and English Translation thereof.

* cited by examiner

SOLAR BOILER TUBE PANEL SUPPORTS

CROSS-REFERENCE TO RELATED APPLICATIONS

Co-pending, commonly owned U.S. patent application Ser. No. 12/703,861, published under Publication No. US 2010/0199977 is incorporated by reference herein in its entirety.

BACKGROUND OF THE INVENTION

1. Field of the Invention

The present invention relates to solar power production, and more particularly, to solar receiver panels for use in solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be utilized without creating radioactive waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar power production can be increased and simplified by using water/steam as the only working fluid in a receiver that is a boiler. This can eliminate the need for an inefficient heat exchanger between two different working fluids. This development has lead to new challenges in handling the intense solar heat without damage to the system. One such challenge is the fact that in typical fossil fuel boilers, heating occurs all around much of the boiler tubing and thermal expansion is uniform, but in solar boilers the heating is typically all on one side of the boiler panels. In typical fossil fuel boilers, water wall tubes often are arranged having heating primarily on only one side, however, in solar boiler applications, heat flux or heat input is at a greater concentration and typically has exclusively one sided heating for all systems. A temperature gradient of up to about 300° F. can exist across the thickness of a solar boiler panel. This one-sided heating causes significant thermal expansion on the heliostat side of boiler panels while the reverse side, which is typically insulated, experiences significantly less expansion. The difference in thermal expansion on the two sides of boiler panels makes solar boiler panels tend to bow outward and can create stresses in the boiler tube panels. Moreover, since solar boilers operate on a daily cycle, the stresses due to thermal expansion gradients can become the basis for fatigue failure.

One approach that has been used to address this problem is to support the panels from the bottom using supports that hold the panel from bowing in the middle, but allow for vertical movement. Such methods as are known are typically complicated in terms of installing, removing, and replacing panels from the supports. Additionally, systems that support boiler panels from the bottom require special plumbing to account for the fact that the top of the panels move due to thermal expansion, which is opposite of typical boiler configurations.

While the known systems of solar power production have generally been considered satisfactory for their intended purposes, there has remained a need in the art for supporting solar receiver panels in solar boilers that can accommodate thermal expansion while alleviating undue stress that could otherwise lead to failure. There is also a need for such a support system that accommodates easy installation, removal, and replacement of boiler panels. The present invention provides a solution to these problems.

SUMMARY OF THE INVENTION

The subject invention is directed to a new and useful solar boiler. The solar boiler includes a boiler support defining an axis along an inboard-outboard direction. A hanger rod is rotatably mounted to the boiler support. A bracket is rotatably mounted to the hanger rod, and a solar boiler panel is mounted to the bracket. The solar boiler panel defines a longitudinal axis that is substantially perpendicular with the axis of the boiler support. The hanger rod connects between the boiler support and the bracket to support the weight of the solar boiler panel from the boiler support. The hanger rod and bracket are configured and adapted to maintain a substantially constant orientation of the bracket during inboard and outboard movement of the bracket relative to the boiler support.

In certain embodiments, the hanger rod is a first hanger rod, and the solar boiler includes a second hanger rod rotatably mounted to the boiler support and the bracket. The first and second hanger rods are substantially parallel to one another throughout a range of motion of the first and second hanger rods. One or both of the hanger rods can include a threaded adjustment rod configured and adapted to adjust the length of the hanger rod by rotation of the threaded adjustment rod. A damper can be mounted to the bracket to dampen motion thereof relative to the boiler support. The solar boiler panel can be mounted to the bracket by way of a clip in a manner that allows relative rotation between the clip and the bracket.

It is also contemplated that the bracket can include a main plate and a panel support plate that are mounted together and are rotatable with respect to one another. The main plate and panel support plate of the bracket can be pinned together, wherein the solar boiler panel is mounted to the panel support plate of the bracket by way of a clip. The clip and bracket can be configured and adapted to allow rotational movement of the solar boiler panel to be accommodated by relative rotation of the main plate and panel support plate of the bracket. The main plate of the bracket can include a rotation stop configured and adapted to contact the panel support plate of the bracket to limit relative rotation of the main plate and panel support plate.

In accordance with certain embodiments, a stop body is mounted to the boiler support, and the bracket includes an inboard stop and an outboard stop each mounted to the bracket. The stop body, inboard stop, and outboard stop are configured and adapted to limit inboard-outboard travel of the bracket relative to the boiler support by contact between the stop body and the outboard stop of the bracket to limit inboard travel of the bracket, and by contact between the stop body and the inboard stop of the bracket to limit outboard travel of the bracket.

The invention also provides a solar boiler panel support system. The system includes a first hanger rod and a second hanger rod, as described above. The system also includes a bracket rotatably mounted to each of the first and second hanger rods, as described above. The bracket includes a panel clip plate configured and adapted to engage a clip mounted to a solar boiler panel. The hanger rods are configured and adapted to connect between a boiler support and the bracket to support the weight of a solar boiler panel therethrough. The hanger rods and bracket are configured and adapted to maintain a substantially horizontal orientation of the bracket during inboard and outboard horizontal movement of the bracket relative to the boiler support.

The invention also provides a method of supporting a receiver panel of a solar boiler. The method includes supporting a bracket on a boiler support wherein the bracket is moveable relative to the boiler support in an inboard-outboard direction. The method also includes supporting a solar boiler receiver panel with the bracket, thereby supporting the weight of the receiver panel with the bracket, wherein inboard-outboard movement of the panel relative to the boiler support due to thermal expansion and contraction is accommodated by the bracket moving inboard and outboard relative to the boiler support.

In accordance with certain aspects, the step of supporting the bracket on a boiler support can include hanging the bracket from the boiler support by a pair of hanger rods. The step of hanging the bracket by a pair of hanger rods can include hanging the bracket with the hanger rods in a manner that maintains a substantially parallel relationship of the hanger rods to one another over a range of motion of the hanger rods relative to the boiler support. A step can be included for dampening movement of the receiver panel relative to the boiler support using a damper mounted to connect between the receiver panel and the boiler support.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
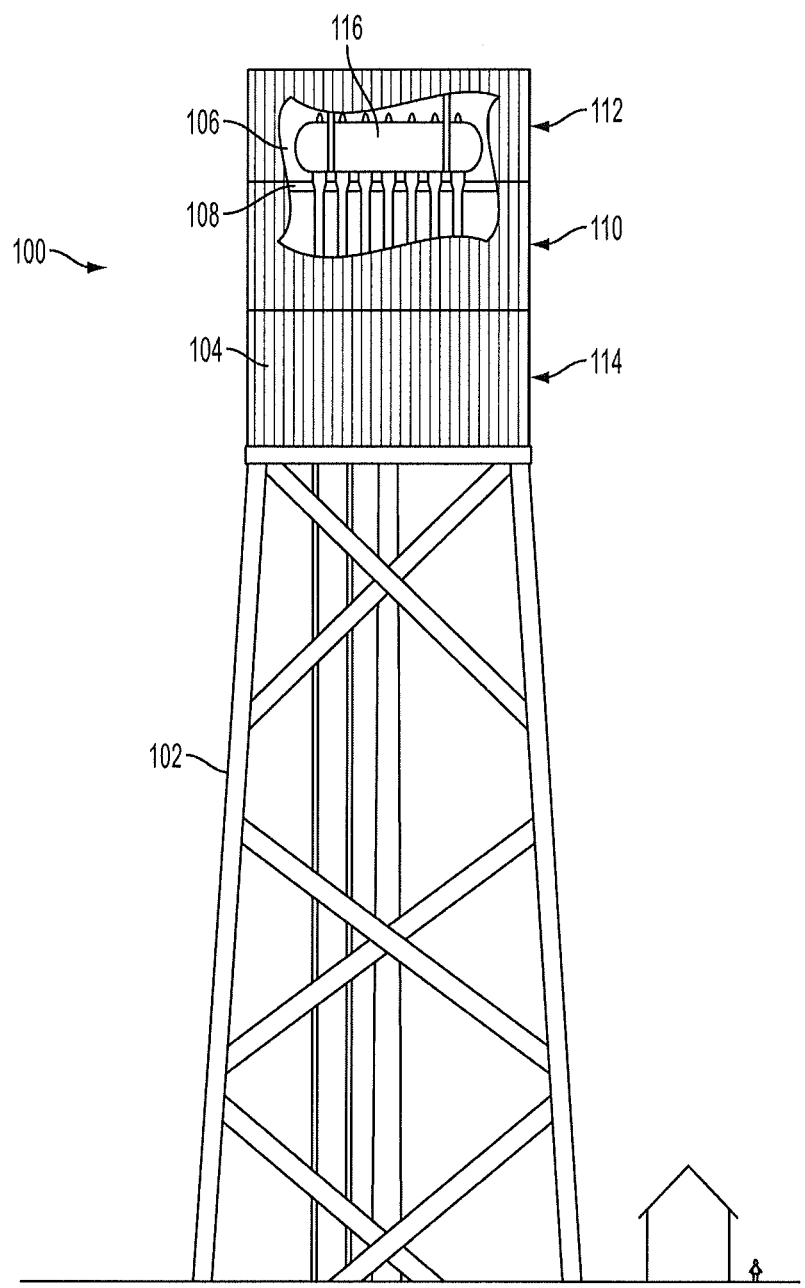
FIG. 1 is a side elevation view of an exemplary embodiment of a solar receiver tower constructed in accordance with the present invention, showing solar receiver panels for the steam generator, superheater, and reheater sections of the solar boiler.
Figure 2:
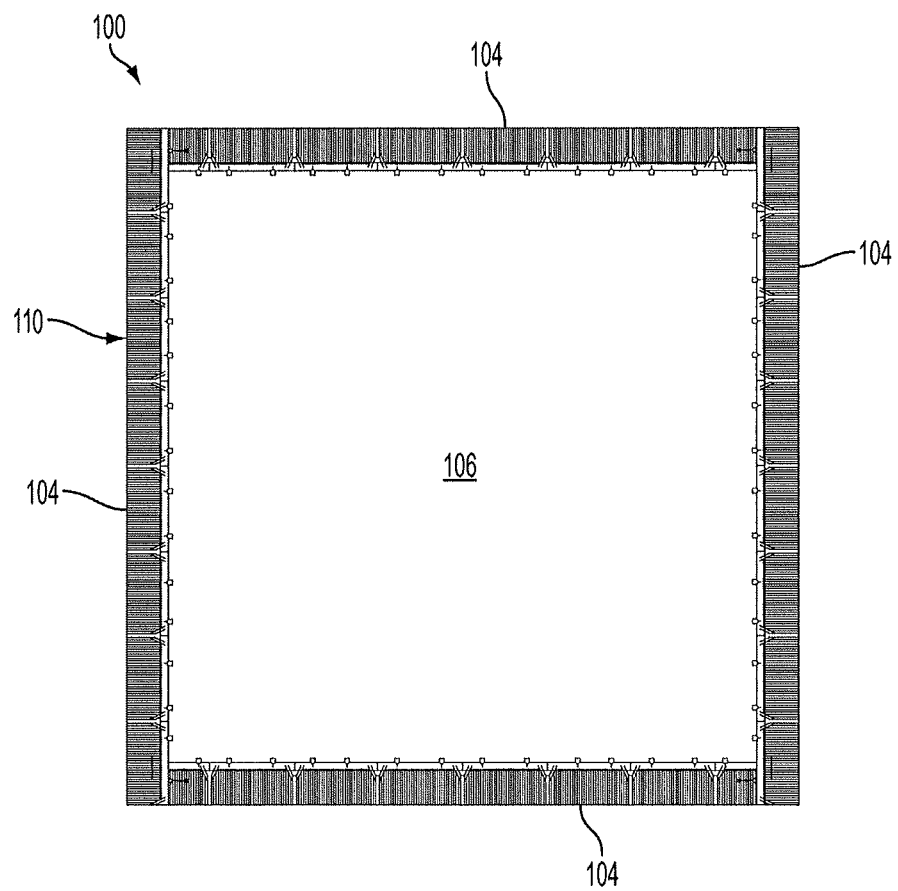
FIG. 2 is a plan view of a portion of the solar boiler of FIG. 1, showing the rectangular perimeter of the solar boiler.

Reference will now be made to the drawings wherein like reference numerals identify similar structural features or aspects of the subject invention. For purposes of explanation and illustration, and not limitation, a partial view of an exemplary embodiment of a solar boiler in accordance with the invention is shown in FIG. 1 and is designated generally by reference character 100. Other embodiments of solar boilers in accordance with the invention, or aspects thereof, are provided in FIGS. 2-12, as will be described. The system of the invention can be used to accommodate thermal expansion and contraction in solar receiver panels of solar boilers, for example.

With reference now to FIG. 1, solar boiler 100 is shown at the top of a solar receiver tower 102, which can be surrounded by a field of heliostats for focusing solar radiation on solar boiler 100. Solar boiler 100 includes a plurality of solar boiler panels 104 forming a perimeter surrounding a boiler interior space 106, which is visible through the cut-away portion in FIG. 1. A support structure 108 within boiler interior space 106 supports solar boiler panels 104. Boiler panels 104 include a steam generator 110 with a superheater 112 contiguous therewith on top of boiler 100, and with a reheater 114 contiguous with steam generator 110 on the bottom of boiler 100. Panels 104 for steam generator 110, superheater 112, and reheater 114 are described in commonly owned, co-pending U.S. Patent Application Publication No. 2010/0199978, which is incorporated by reference herein in its entirety.

As can be seen in the cut-away portion of FIG. 1, a steam drum 116 is supported on structure 108 within boiler interior space 106. Since boiler panels 104 form a substantially contiguous heat transfer surface configured to block solar radiation incident thereon from boiler interior space 106, drum 116 is protected from the intense thermal radiation incident on the solar receiver during operation. Solar boiler panels 104 form four boiler walls surrounding boiler interior space 106, as shown in the plan view of the panels 104 of steam generator 110 in FIG. 2. For sake of clarity, only a few of the panels 104 are identified with reference characters in FIG. 2. Any other suitable number of walls can be used without departing from the spirit and scope of the invention. Four wall boiler configurations are described in greater detail in commonly owned, co-pending U.S. Patent Application Publication Nos. 2010/0199974 and 2010/0199979, each of which is incorporated by reference herein in its entirety.

Figure 3:
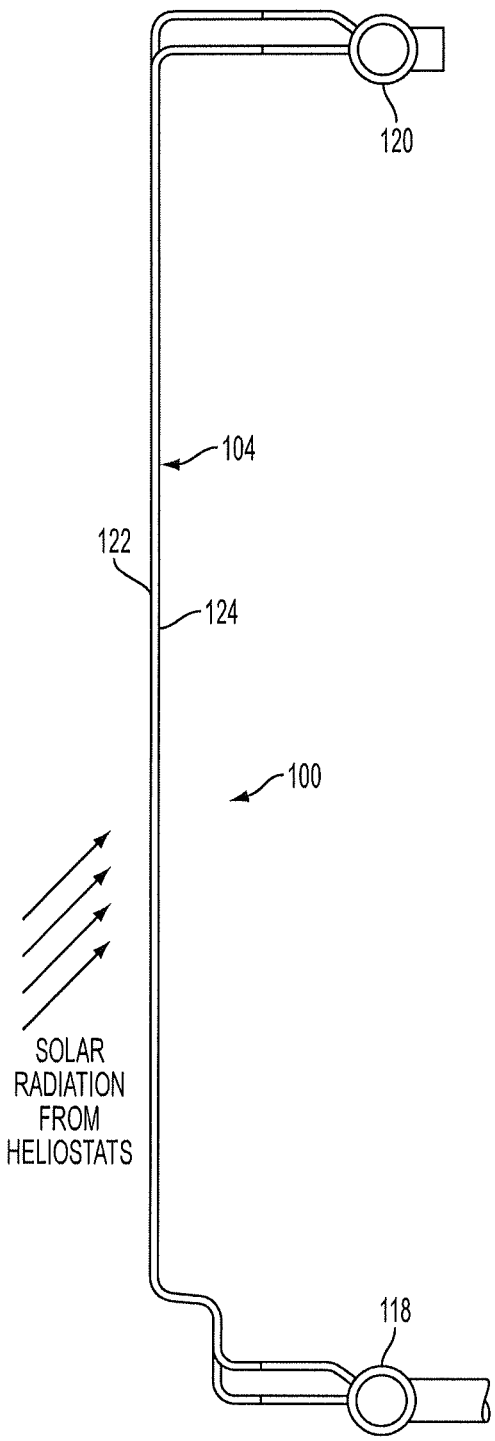
FIG. 3 is a side elevation view of one of the solar receiver panels of FIG. 1, showing the solar radiation incident on the panel schematically.
Figure 4:
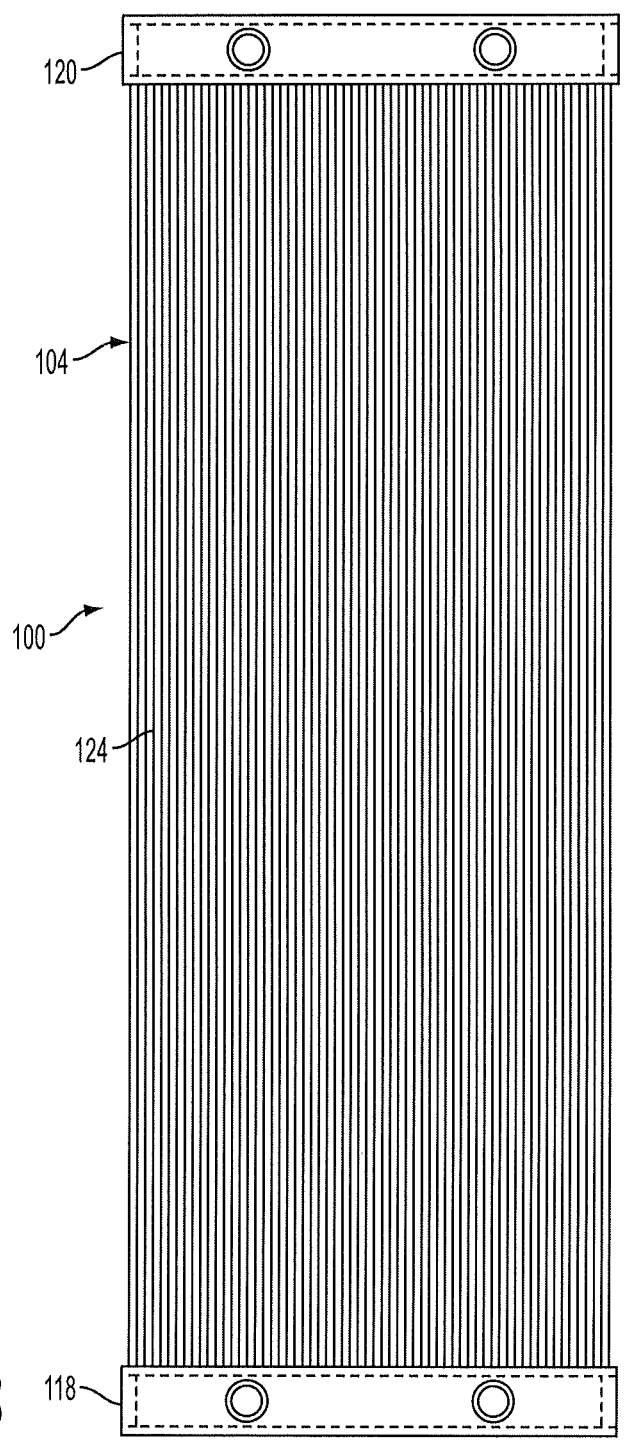
FIG. 4 is an inboard elevation view of the solar receiver panel of FIG. 3, showing the plurality of boiler tubes connecting between inlet and outlet headers.

Referring now to FIGS. 3 and 4, there are shown side and interior elevation views, respectively, of a solar boiler panel 104 of a solar boiler 100 constructed in accordance with the present invention. Boiler panel 104 has a plurality of tubes fluidly connecting an inlet header 118 to an outlet header 120. The tubes of boiler panel 104 form a planar solar receiver surface 122 and opposed internal insulated surface 124. The exterior receiver surface 122 receives solar energy, for example from a field of heliostats, as indicated by the arrows in FIG. 3.

Figure 5:
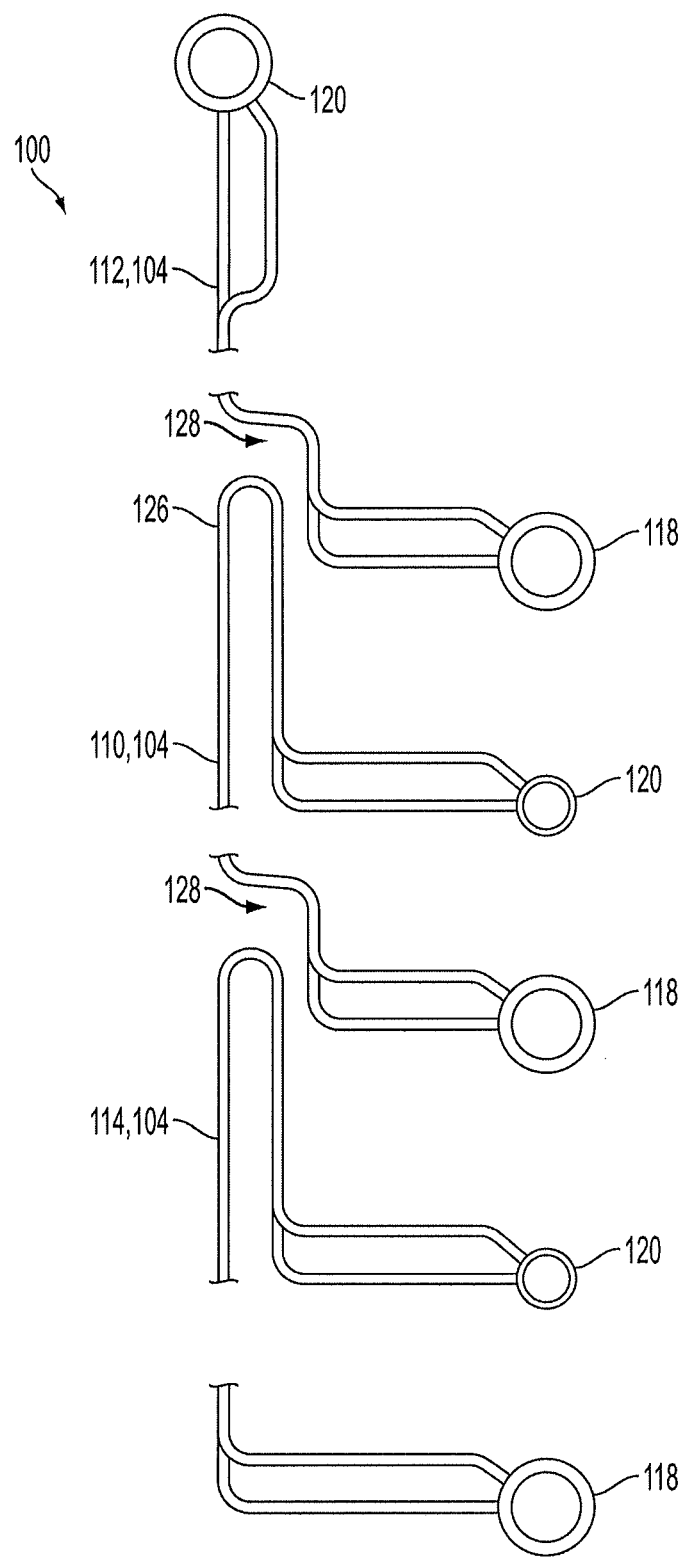
FIG. 5 is a partially cut away side elevation view of a portion of the steam generator, superheater, and reheater sections of the solar boiler of FIG. 1, showing how adjacent panels overlap one another.

With reference now to FIG. 5, panels 104 of steam generator 110, superheater 112, and reheater 114 are stacked vertically along the walls of boiler 100. A portion 126 of panel 104 of steam generator 110 overlaps a portion of panel 104 of superheater 112 to protect header 118 and other internal components from leakage of solar radiation. Panel 104 of reheater 114 overlaps panel 104 of steam heater 110 in the same manner. Gaps 128 between vertically adjacent panels 104 provide room for thermal expansion and contraction in vertical and horizontal directions. This overlapping panel arrangement is described in commonly owned, co-pending U.S. Patent Application Publication No. 2010/0199978, which is incorporated by reference herein in its entirety.

Figure 6:
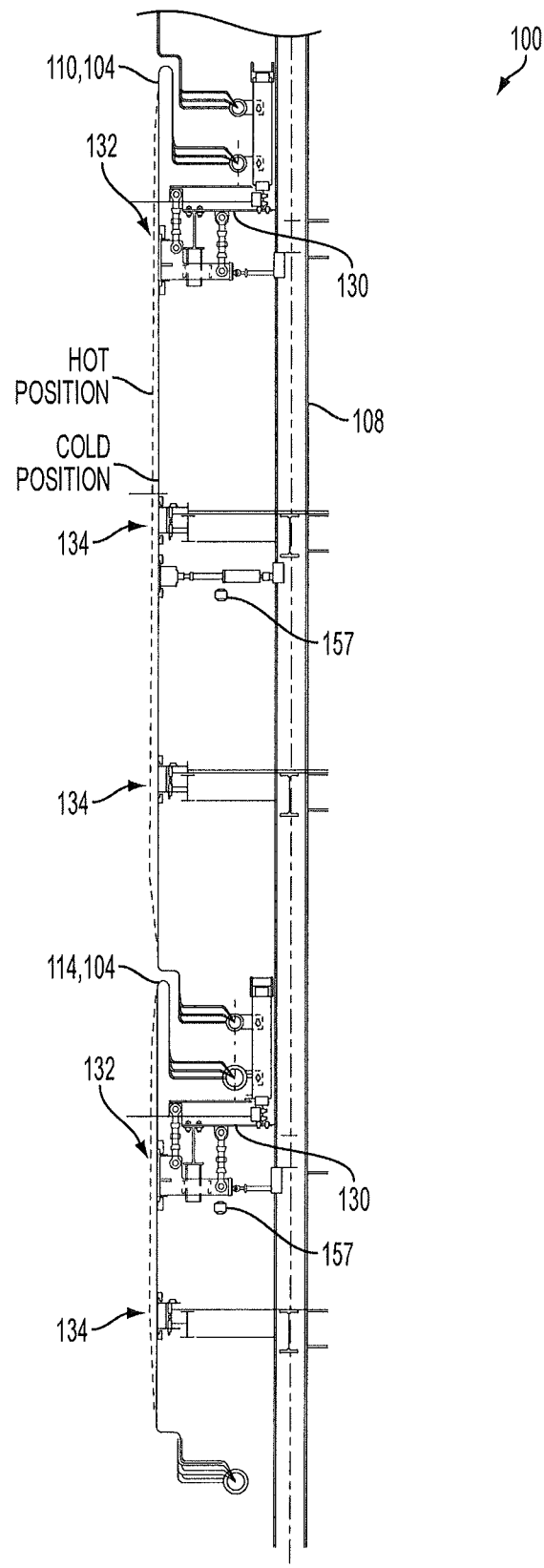
FIG. 6 is a side elevation view of a portion of the steam generator, superheater, and reheater sections of the solar boiler of FIG. 5, showing the support system mounting the panels to the boiler support structure.

Referring now to FIG. 6, panels 104 are shown supported on boiler support structure 108 by a system that accommodates outward bowing of the panels 104 due to thermal expansion and contraction. Support structure 108 includes supports 130 which are the primary supports for the weight of their respective panels 104. Main support systems 132 connect between respective supports 130 and panels 104, and guides 134 constrain movement of panels 104 without necessarily supporting the weight thereof, as described below in greater detail.

Figure 7:
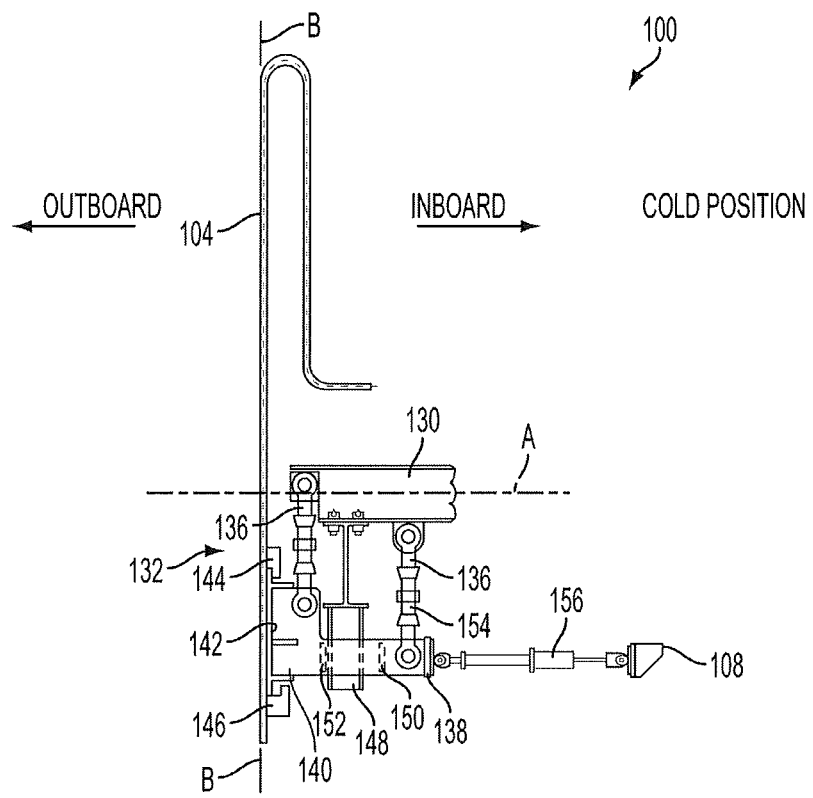
FIG. 7 is a side elevation view of a portion of the support system of FIG. 6, showing the arrangement of the hanger rods, bracket, and damper in the cold position, e.g., when the solar receiver panel is not receiving solar radiation such as during a night time layover.
Figure 8:
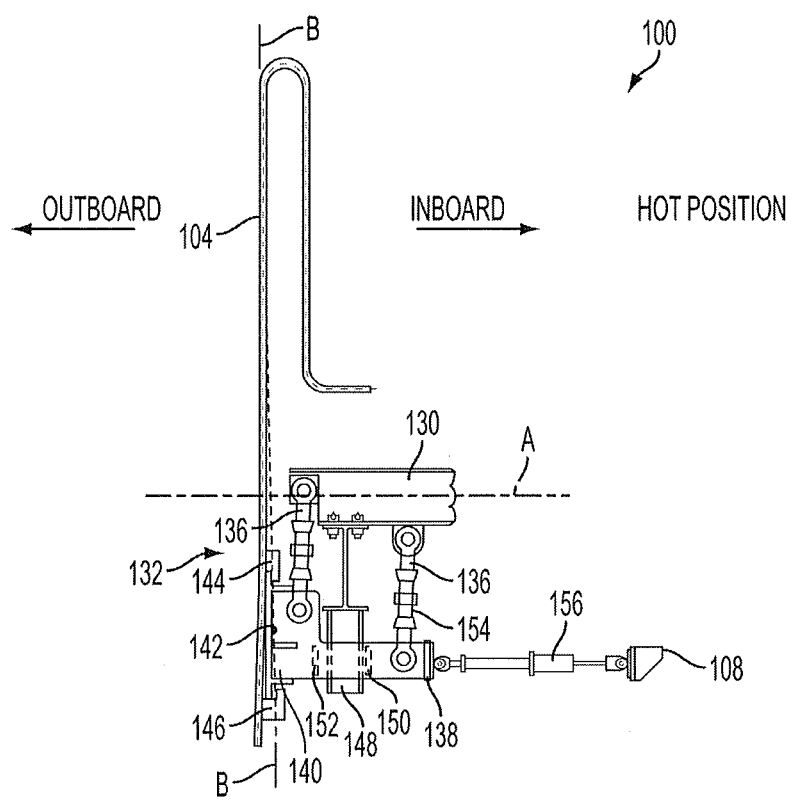
FIG. 8 is a side elevation view of the portion of the mounting system of FIG. 7, showing the arrangement of the hanger rods, bracket, and damper in the hot position, e.g., when the solar receiver panel is operational, receiving solar radiation from a field of heliostats.

With reference to FIGS. 7 and 8, a main support system 132 is shown and described in greater detail. Each support 130 defines an axis A along an inboard-outboard direction, as indicated with the arrows in FIGS. 7 and 8. A pair of hanger rods 136 is rotatably mounted to each support 130. A bracket 138 is rotatably mounted to the hanger rods 136, and a solar boiler panel 104 is mounted to each bracket 138. Hanger rods 136 connect between boiler support 130 and bracket 138 to support the weight of panel 104 therethrough from support 130. In this manner, main support system 132 supports panel 104 from support 130 with the longitudinal axis B of panel 104 substantially perpendicular to axis A of support 130. In other words, panel 104 is supported in a vertical orientation, while axis A is in a horizontal orientation. Supports 130 could be angled relative to axis A. For example, the beam forming a given support 130 can be angled upward, downward, or laterally from a normal horizontal cantilever configuration, while still defining an inboard outboard direction and corresponding horizontal axis.

Hanger rods 136 and bracket 138 are configured and adapted to maintain a substantially constant orientation of bracket 138 during inboard and outboard movement of bracket 138 relative to support 130. System 132 and panel 104 in FIG. 7 are shown in a cold position, e.g., when boiler 100 is relatively cool as when boiler 100 is not in operation. This can occur, for example at night time when boiler 100 is in a layover mode due to the absence of sunlight. In the cold position, there is negligible thermal differential expansion in panel 104, and the tubes of panel 104 are aligned with axis B. During normal operation, there is intense solar radiation from the heliostat field incident on the exterior of panels 104, which results in what is referred to herein as the hot position. Due to this one-sided heating, the exterior of panels 104 undergo greater thermal expansion on their outboard aspects then on their inboard aspects, resulting in a bowing outward, which is indicated in dashed lines as the hot position, bowing outward in FIG. 6. FIG. 8 shows system 132 in the hot position with panel 104 generally aligned with but bowing outward relative to axis B. In moving from the cold position in FIG. 7 to the hot position in FIG. 8, hanger rods 136 rotate with respect to support 130 and with respect to bracket 138. Since hanger rods 136, support 130, and bracket 138 form a parallelogram linkage, bracket 138 retains its angular orientation relative to support 130 in the hot and cold positions, and while transitioning therebetween. Similarly, hanger rods 136 remain parallel to one another throughout their range of motion.

Bracket 138 includes a main plate 140 and a panel clip plate 142 mounted, e.g., by welding, perpendicular thereto. Panel 104 includes an upper clip 144 and a lower clip 146 mounted thereto, e.g., by welding. Panel 104 is mounted to bracket 138 by positioning panel clip plate 142 between upper and lower clips 144 and 146. As can be seen by comparing the position of panel clip plate 142 in lower clip 146 as shown in FIGS. 7 and 8, there is play between lower clip 146 and panel clip plate 142 in the inboard-outboard direction. This play allows panel 104 to freely become angled locally relative to the vertical axis B in the hot position without creating undue stresses in panel 104 and system 132. There is also a smaller amount of play between clip plate 142 and upper clip 144, for example about 1/16 of an inch, to prevent upper clip 144 binding on clip plate 142.

With continued reference to FIGS. 7 and 8, a stop body 148 is mounted to support 130. Bracket 138 includes an inboard stop 150 and an outboard stop 152 each mounted to main plate 140 of bracket 138. Stops 150 and 152 are in the form of plates mounted perpendicular to main plate 140 of bracket 138, i.e., extending in the direction into and out of the viewing plane in FIGS. 7 and 8. Stop body 148, inboard stop 150, and outboard stop 152 are configured and adapted to limit inboard-outboard travel of bracket 138 relative to boiler support 130. Travel of bracket 138 in the inboard direction is limited by contact between stop body 148 and outboard stop 152. Travel of bracket 138 in the outboard direction is limited by contact between stop body 148 and inboard stop 150. The upward displacement of bracket 138 due to the rotation of hanger rods 136 (as they rotate through their range of motion in operation) is negligible in this application, e.g., about 1/8 of an inch.

Hanger rods 136 each include a threaded adjustment rod 154 with a nut mounted thereto to facilitate rotation of the adjustment rod 154. In FIGS. 7 and 8, only one adjustment rod 154 is identified with reference characters for sake of clarity. Each adjustment rod 154 is threaded at either end into the end pieces of the respective hanger rod 136 so that adjustment of the length of the hanger rod 136 can be accomplished by rotation of the adjustment rod 154 relative to the end pieces of the hanger rod 136. This facilitates matching the lengths of both hanger rods 136 to fine tune the linkage motion, and allows compensation for manufacturing and erection tolerances. While advantageous for adjustability, it is optional to have an adjustment rod 154 on both hanger rods 154, as those skilled in the art will readily appreciate that the invention can be practiced with one or both adjustment rods 154 omitted.

Referring still to FIGS. 7 and 8, a damper 156 is mounted at one end to bracket 138 and at the other end to support structure 108 to dampen motion of bracket 138 relative to support 130. Damper 156 is in the form of a snubber, but those skilled in the art will readily appreciate that any other suitable damper means can be used without departing from the spirit and scope of the invention. Damper 156 reduces impact loads or sudden deformations in panel 104, for example, due to wind forces, while allowing for motion of bracket 138 to accommodate thermal expansion and contraction of panel 104. Due to space constraints at the corners of boiler 100, dampers on the corner can be offset from the other dampers in a given section. FIG. 6 shows corner dampers 157, which are offset below adjacent dampers to avoid interference therewith at the corners of boiler 100.

Figure 9:
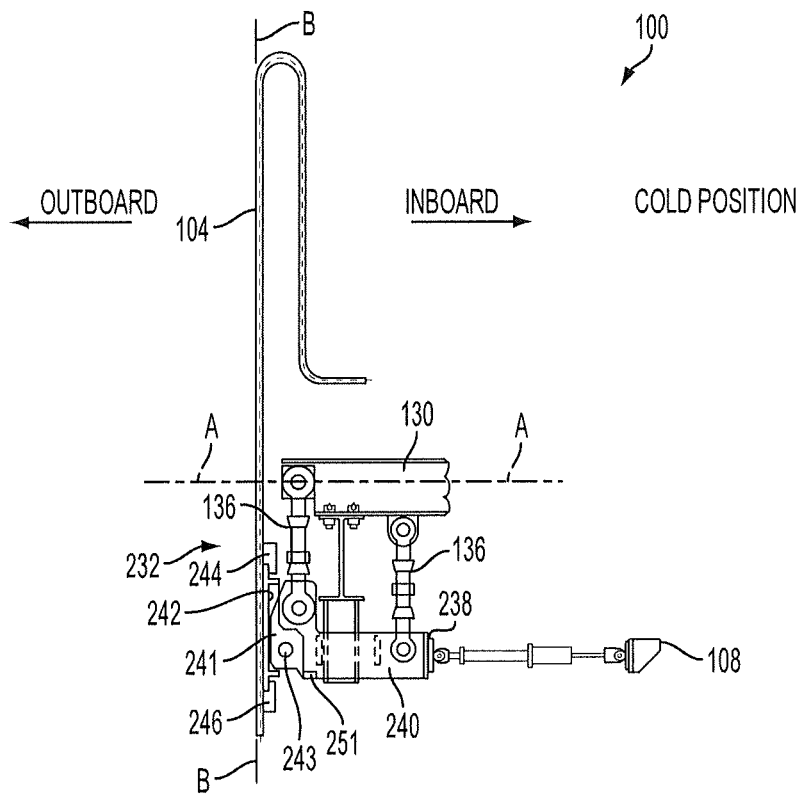
FIG. 9 is a side elevation view of a portion of another exemplary embodiment of a system for mounting solar receiver panels to a boiler support structure, showing the main and panel support plates of the bracket pinned together for rotation relative to one another, with the system in the cold position.
Figure 10A:
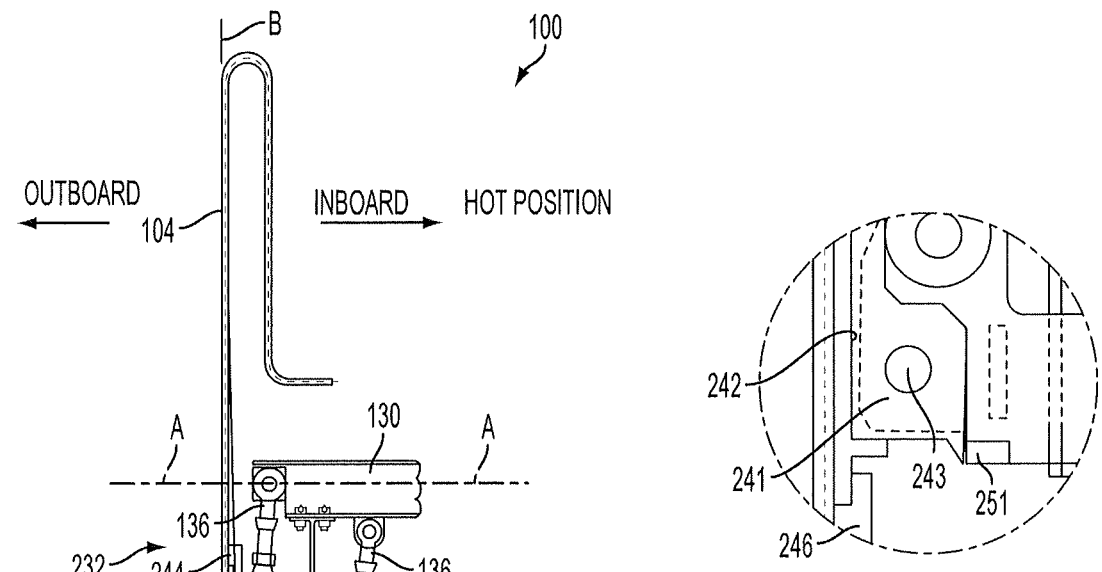
FIG. 10A is a side elevation view of the portion of the mounting system of FIG. 9, showing the system in the hot position.
Figure 10B:
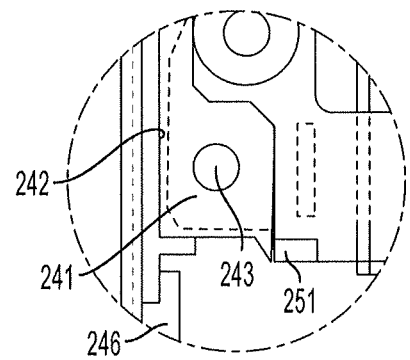
FIG. 10B is an enlarged side elevation view of a portion of the mounting system of FIG. 10A, showing the gap between the panel support plate and the rotation stop of the bracket in the hot position.

Referring now to FIGS. 9-10B, another exemplary embodiment of a main support system 232 is shown supporting a panel 104 in the hot and cold positions, respectively. System 232 includes hanger rods 136, which are described above with reference to system 132. The outboard most hanger rod 136 in FIGS. 9 and 10A is sized larger than the inboard hanger rod 136 because it supports a larger panel load, however, both hanger rods 136 can be made the same size if they are sized adequately for the largest of the two respective loads. Bracket 238 of system 232 includes two plates, namely main plate 240 and panel support plate 241, that are pinned together by pin 243 so as to be rotatable with respect to one another about pin 243. Panel support plate 241 includes a panel clip plate 242, much like panel clip plate 142 described above. Panel 104 is mounted to panel support plate 241 by positioning panel clip plate 242 between upper and lower clips 244 and 246.

Rather than accommodating relative rotation between main plate 240 and the clips 244 and 246 with play in lower clip 246, as described above with respect to system 132, in system 232 this relative rotation is accommodated by relative rotation of panel support plate 241 and main plate 240 about pin 243. This provides advantages including having all of the clips 244 and 246 of the same size, supporting the horizontal reaction load from the panel tubes to the support equally in both the upper and lower clips 244 and 246, and causing less wear on the clips 244 and 246 since they do not rely on sliding contact. Main plate 240 includes a rotation stop 251, which is a plate mounted perpendicular to main plate 240, much like stops 150 and 152 described above. Rotation stop 251 limits relative rotation of panel support plate 241 in the counter-clockwise direction, as oriented in FIGS. 9 and 10A. In other words, rotation stop 251 contacts panel support plate 241 in the cold position to limit further counter clockwise rotation of panel support plate 241. In the hot position shown in FIG. 10A, there is a gap between panel support plate 241 and rotation stop 251. The gap is small enough to not be visible in FIG. 10A, but it is shown in FIG. 10B, and can be approximately ⅛ of an inch at its widest extent, for example, or of any suitable size. Boiler 100 can make use of either or both types of system 132 or 232.

Figure 11:
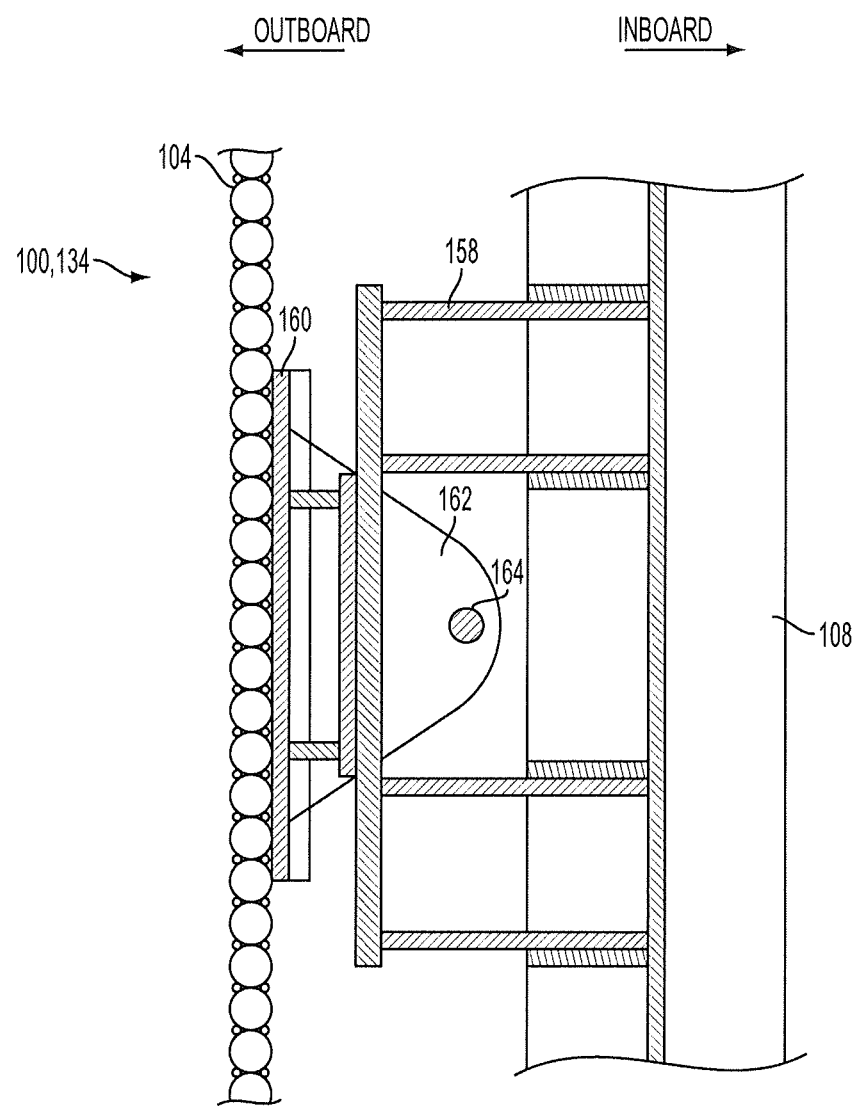
FIG. 11 is a cross-sectional plan view of a portion of the mounting system of FIG. 6, showing one of the panel guides.
Figure 12:
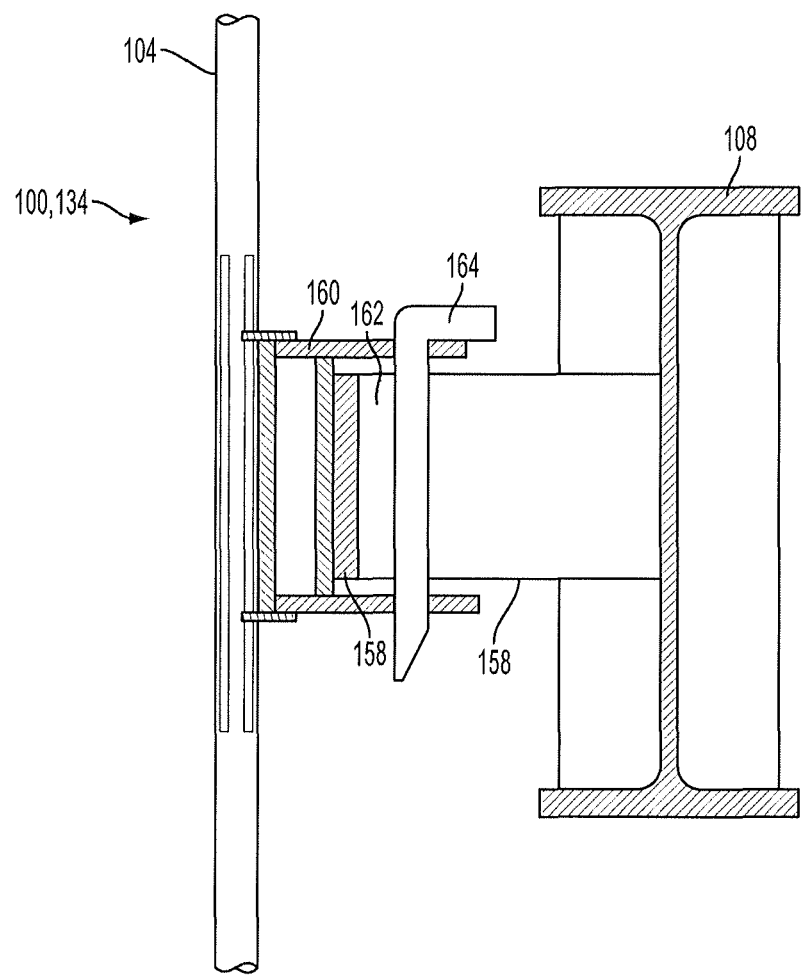
FIG. 12 is a cross-sectional side elevation view of the panel guide of FIG. 11, showing the pin connecting the guide to the boiler support structure.

With reference now to FIGS. 11 and 12, one of the guides 134 of FIG. 6 is shown and described in greater detail. A boiler stay 158 is operatively connected to support structure 108. A panel stay 160 is slideably engaged to boiler stay 158. Panel 104 is operatively connected to panel stay 160 with panel stay 160 affixed to the plurality of tubes of panel 104. A horizontal gap 162 is defined between panel stay 160 and a pin 164 that is pinned through the two main flanges of panel stay 160. Gap 162 provides clearance for panel stay 160 to move inboard and outboard relative to boiler stay 158 to accommodate bowing in panel 104. Inboard motion of panel 104 is limited by contact between boiler stay 158 and panel stay 160 as in the cold position shown in both of FIGS. 11 and 12. In the hot position, outboard motion of panel 104 is limited by pin 164 contacting boiler stay 158 on the opposite end of gap 162 from the position shown in FIGS. 11 and 12. System 132 supports the entire deadweight of panel 104. Boiler stay 158 is also vertically spaced from panel stay 160 to allow for vertical expansion and contraction of panel 104, i.e., panel stay 160 does not rest on top of boiler stay 158. Panel stay 160 is also free to move in the lateral direction (up and down as oriented in FIG. 11) to accommodate lateral thermal expansion and contraction of panels 104. Guides 134 serve to guide and limit inboard and outboard motion of panels 104.

Referring again to FIG. 6, panel 104 of steam generator 110 has its weight primarily supported from a support 130 by a system 132 as described above. Below system 132, there are two guides 134. Similarly, panel 104 of reheater 114 has its weight supported from a support 130 by a system 132 with one guide 134 mounted therebelow. Since systems 132 and guides 134 together support panels 104 of steam generator 110 and reheater 114 in a manner that allows for inboard and outboard bowing motion as described above, thermally induced stress and fatigue are reduced as boiler 100 cycles through daily solar cycles and the like. Superheater 112 (shown in FIGS. 1 and 5) can be supported similarly, however it is contemplated that in applications where the tubes of the superheater panels 104 are smaller than the tubes in steam generator 110 and reheater 114, for example, there will be less panel bowing due to a lesser thermal gradient between the heated side and backside of the tube resulting from higher steam bulk temperatures and also a smaller tube geometric section modulus. In such configurations the thermal differential expansion and contraction is less dominant in a bowing direction, and more dominant in a lengthwise direction. It can be advantageous from a stress and fatigue aspect to restrain the small amount of bowing, and instead accommodate lengthwise linear expansion and contraction, rather than accommodating bowing it with systems 132 or 134. Suitable supports for such applications are described, for example, in commonly owned, co-pending U.S. Patent Application Publication no. 2010/0199977, which is incorporated by reference herein in its entirety. As shown in FIG. 5, header 120 of panels 104 of superheater 112 is configured differently from those of steam generator 110 and reheater 104. Namely, header 120 is vertically above its respective panel tubes. Panels 104 of superheater 104 are vertically hung and suspended directly from header 120, which is vertically hung with hanger rods.

While described herein in the context of a three-stage boiler, those skilled in the art will readily appreciate that any suitable number of stages can be used, and can be arranged in any suitable manner without departing from the spirit and scope of the invention.

The methods and systems of the present invention, as described above and shown in the drawings, provide for support of solar receiver panels with superior properties including accommodating bowing of the panels while reducing or eliminating thermally induced stress and fatigue. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A solar boiler comprising:
   a) a boiler support defining an axis along an inboard-outboard direction;
   b) a hanger rod rotatably mounted to the boiler support;
   c) a bracket rotatably mounted to the hanger rod; and
   d) a solar boiler panel mounted to the bracket and defining a longitudinal axis that is substantially perpendicular with the axis of the boiler support, wherein the hanger rod connects between the boiler support and the bracket to support the weight of the solar boiler panel from the boiler support, and wherein the hanger rod and bracket are configured and adapted to maintain a substantially constant orientation of the bracket during inboard and outboard movement of the bracket relative to the boiler support, wherein the hanger rod is a first hanger rod, wherein the solar boiler includes a second hanger rod rotatably mounted to the boiler support and the bracket, wherein the first and second hanger rods are substantially parallel to one another throughout a range of motion of the first and second hanger rods, wherein the first hanger rod, the second hanger rod the boiler support and the bracket form a parallelogram linkage, and wherein the first and second hanger rods are substantially parallel to the longitudinal axis of the solar boiler panel in a cold state.

2. A solar boiler as recited in claim 1, further comprising a damper mounted to the bracket to dampen motion thereof relative to the boiler support.

3. A solar boiler as recited in claim 1, wherein the solar boiler panel is mounted to the bracket by way of a clip in a manner that allows relative rotation between the clip and the bracket.

4. A solar boiler as recited in claim 1, wherein the bracket includes a main plate and a panel support plate that are mounted together and are rotatable with respect to one another.

5. A solar boiler as recited in claim 4, wherein the main plate and panel support plate of the bracket are pinned together, wherein the solar boiler panel is mounted to the panel support plate of the bracket by way of a clip, and wherein the clip and bracket are configured and adapted to allow rotational movement of the solar boiler panel to be accommodated by relative rotation of the main plate and panel support plate of the bracket.

6. A solar boiler as recited in claim 5, wherein the main plate of the bracket includes a rotation stop configured and adapted to contact the panel support plate of the bracket to limit relative rotation of the main plate and panel support plate.

7. A solar boiler as recited in claim 1, further comprising a stop body mounted to the boiler support, wherein the bracket includes an inboard stop and an outboard stop each mounted to the bracket, wherein the stop body, inboard stop, and outboard stop are configured and adapted to limit inboard-outboard travel of the bracket relative to the boiler support by contact between the stop body and the outboard stop of the bracket to limit inboard travel of the bracket, and by contact between the stop body and the inboard stop of the bracket to limit outboard travel of the bracket.

8. A solar boiler as recited in claim 1, wherein the hanger rod includes a threaded adjustment rod configured and adapted to adjust the length of the hanger rod by rotation of the threaded adjustment rod.

9. A solar boiler panel support system comprising:
   a) a first hanger rod and a second hanger rod, each configured and adapted to be rotatably mounted to a stationary boiler support in parallel orientation relative to the other throughout a range of motion of the first and second hanger rods; and
   b) a bracket rotatably mounted to each of the first and second hanger rods, the bracket including a panel clip plate configured and adapted to engage a clip mounted to a solar boiler panel, wherein the hanger rods are configured and adapted to connect between a boiler support and the bracket to form a parallelogram linkage and to support the weight of a solar boiler panel therethrough, wherein the hanger rods and bracket are configured and adapted to maintain a substantially horizontal orientation of the bracket during inboard and outboard horizontal movement of the bracket relative to the boiler support, and wherein the first and second hanger rods are each configured to be substantially parallel to a longitudinal axis of a solar boiler panel in a cold state.

10. A solar boiler panel support system as recited in claim 9, further comprising a damper mounted to the bracket to dampen motion thereof.

11. A solar boiler panel support system as recited in claim 9, wherein the bracket includes a main plate and a panel support plate that are mounted together and are rotatable with respect to one another.

12. A solar boiler panel support system as recited in claim 11, wherein the main plate and panel support plate of the bracket are pinned together.

13. A solar boiler panel support system as recited in claim 12, wherein the main plate of the bracket includes a rotation stop configured and adapted to contact the panel support plate of the bracket to limit relative rotation of the main plate and panel support plate.

14. A solar boiler panel support system as recited in claim 9, wherein the bracket includes an inboard stop and an outboard stop each mounted to the bracket, wherein inboard stop and outboard stop are configured and adapted to limit inboard-outboard travel of the bracket relative to a boiler support by contact between a stop body mounted to the boiler support and the outboard stop of the bracket to limit inboard travel of the bracket, and by contact between the stop body and the inboard stop of the bracket to limit outboard travel of the bracket.

15. A solar boiler panel support system as recited in claim 9, wherein each hanger rod includes a threaded adjustment rod configured and adapted to adjust the length of the hanger rod by rotation of the threaded adjustment rod.

16. A method of supporting a receiver panel of a solar boiler comprising:
   a) supporting a bracket on a boiler support including hanging the bracket from the boiler support by a pair of hanger rods, wherein the hanger rods, the boiler support and the bracket form a parallelogram linkage, and wherein the bracket is moveable relative to the boiler support in an inboard-outboard direction; and
   b) supporting a solar boiler receiver panel with the bracket, thereby supporting the weight of the receiver panel with the bracket, wherein inboard-outboard movement of the panel relative to the boiler support due to thermal expansion and contraction is accommodated by the bracket moving inboard and outboard relative to the boiler support, and wherein the pair of hanger rods is substantially parallel to a longitudinal axis of the solar boiler receiver panel in a cold state.

17. A method of supporting a receiver panel as recited in claim 16, wherein the step of hanging the bracket by a pair of hanger rods includes hanging the bracket with the hanger rods in a manner that maintains a substantially parallel relationship of the hanger rods to one another over a range of motion of the hanger rods relative to the boiler support.

18. A method of supporting a receiver panel as recited in claim 16, further comprising dampening movement of the receiver panel relative to the boiler support using a damper mounted to connect between the receiver panel and the boiler support.

\* \* \* \* \*